(12) United States Patent
Forsell

(10) Patent No.: US 11,797,310 B2
(45) Date of Patent: *Oct. 24, 2023

(54) FLOATING-POINT SUPPORTIVE PIPELINE FOR EMULATED SHARED MEMORY ARCHITECTURES

(71) Applicant: TEKNOLOGIAN TUTKIMUSKESKUS VTT OY, Espoo (FI)

(72) Inventor: Martti Forsell, Oulu (FI)

(73) Assignee: TEKNOLOGIAN TUTKIMUSKESKUS VTT OY, Vtt (FI)

( * ) Notice: Subject to any disclaimer, the term of this patent is extended or adjusted under 35 U.S.C. 154(b) by 666 days.

This patent is subject to a terminal disclaimer.

(21) Appl. No.: 15/031,285

(22) PCT Filed: Oct. 23, 2014

(86) PCT No.: PCT/FI2014/050804
§ 371 (c)(1),
(2) Date: Apr. 22, 2016

(87) PCT Pub. No.: WO2015/059362
PCT Pub. Date: Apr. 30, 2015

(65) Prior Publication Data
US 2016/0283249 A1    Sep. 29, 2016

(30) Foreign Application Priority Data
Oct. 23, 2013   (EP) ..................................... 13189861

(51) Int. Cl.
*G06F 9/38*     (2018.01)
*G06F 15/76*    (2006.01)

(52) U.S. Cl.
CPC .......... *G06F 9/3867* (2013.01); *G06F 9/3851* (2013.01); *G06F 9/3873* (2013.01);
(Continued)

(58) Field of Classification Search
CPC .... G06F 9/3867; G06F 9/3869; G06F 9/3885; G06F 15/76; G06F 9/3851; G06F 9/3173; G06F 9/3175
See application file for complete search history.

(56) References Cited

U.S. PATENT DOCUMENTS 5,600,810 A * 2/1997 Ohkami ................ G06F 9/3853
                                                          712/226
5,864,692 A * 1/1999 Faraboschi ........... G06F 9/3842
                                                          711/163
(Continued)

FOREIGN PATENT DOCUMENTS

JP   2002333978 A   11/2002
JP   2010073197 B2   4/2010
(Continued)

OTHER PUBLICATIONS

Forsell, "MTAC—A Multithreaded VLIW Architecture for PRAM Simulation", 1997, pp. 1037-1055.*
(Continued)

*Primary Examiner* — David J. Huisman
(74) *Attorney, Agent, or Firm* — Robert P. Michal, Esq.; Carter, DeLuca & Farrell LLP

(57) ABSTRACT

A processor architecture arrangement for emulated shared memory (ESM) architectures is disclosed. The arrangement has a number of multi-threaded processors, each provided with an interleaved inter-thread pipeline and a plurality of functional units for carrying out arithmetic and logical operations on data. The pipeline has at least two operatively parallel pipeline branches. The first pipeline branch includes
(Continued)

a first sub-group of the plurality of functional units, such as ALUs (arithmetic logic unit) for carrying out integer operations. The second pipeline branch includes non-overlapping subgroup of the plurality of functional units, such as FPUs (floating point unit) for carrying out floating point operations. One or more of the functional units of at least the second sub-group are located operatively in parallel with the memory access segment of the pipeline.

2 Claims, 4 Drawing Sheets

(52) U.S. Cl.
CPC .......... *G06F 9/3875* (2013.01); *G06F 9/3885* (2013.01); *G06F 15/76* (2013.01)

(56) References Cited

U.S. PATENT DOCUMENTS

| | | | | |
|---|---|---|---|---|
| 5,887,160 | A | * | 3/1999 | Lauritzen ............... G06F 9/3867 708/495 |
| 5,922,065 | A | * | 7/1999 | Hull ..................... G06F 9/30072 712/203 |
| 2002/0169942 | A1 | | 11/2002 | Sugimoto |
| 2003/0137321 | A1 | * | 7/2003 | Arakawa ............ H03K 19/0016 326/21 |
| 2003/0154227 | A1 | * | 8/2003 | Howard ................. G06F 7/485 708/495 |
| 2008/0141253 | A1 | | 6/2008 | Luick |
| 2010/0077177 | A1 | | 3/2010 | Luick |

FOREIGN PATENT DOCUMENTS

| | | |
|---|---|---|
| WO | 199516952 | 6/1995 |
| WO | 0690372 A1 | 1/1996 |
| WO | 2006094196 A2 | 9/2006 |

OTHER PUBLICATIONS

Forsell, "Minimal pipeline architecture—an alternative to superscalar architecture", 1996, pp. 277-284.*
Hennessy et al., "Computer Architecture—A Quantitative Approach", 2nd Edition, 1996, pp. 187-194 and 335-352.*
Forsell, M et al. Supporting Ordered Multiprefix Operations in Emulated Shared Memory CMPs, In the Proceedings of the 2011 International Conference on Parallel and Distributed Processing Techniques and Applications (PDPTA'11), Jul. 18-21, 2011, Las Vegas, USA, 506-512.
Forsell, M, Step Caches—a Novel Approach to Concurrent Memory Access on Shared Memory MP-SOCs, In the proceedings of the 23th IEEE NORCHIP Conference, Nov. 21-22, 2005, Oulu, Finland, 4 pages.
Forsell, M, Reducing the associativity and size of step caches in CRCW operation, In the Proceeding of 8th Workshop on Advances in Parallel and Distributed Computational Models (in conjunction with the 20th IEEE International Parallel and Distributed Processing Symposium, IPDPS'06), Apr. 25, 2006, Rhodes, Greece, 7 pages.
Forsell, M, Realizing Multioperations for Step Cached MP-SOCs, In the Proceedings of the International Symposium on System-on-Chip 2006 (SOC'06), Nov. 14-16, 2006, Tampere, Finland, 77-82.
Forsell, M, Total Eclipse—An Efficient Architectural Realization of the Parallel Random Access Machine, In Parallel and Distributed Computing Edited by Alberto Ros, INTECH, Vienna, 2010, 39-64.
European Patent Office European search report of the priority applicaton No. 13189861.0 dated Apr. 1, 2014, 1 page.
Okamoto, Kazuaki et al., Multithreaded Execution Mechanisms on a Massively Parallel Computer, Information Processing Society of Japan, Dec. 1996, pp. 2398-2407, vol. 37 No. 12, Japan.
Forsell, Martti, Architectural Differences of Efficient Sequential and Parallel Computers, Journal of Systems Architecture, Jul. 2002, pp. 1017-1041, vol. 47 No. 13, Elsevier North Holland Inc., USA.

* cited by examiner

FLOATING-POINT SUPPORTIVE PIPELINE FOR EMULATED SHARED MEMORY ARCHITECTURES

FIELD OF THE INVENTION

Generally the present invention pertains to computer science and computer architectures. In particular, the invention relates to the optimization of pipeline architecture in connection with emulated shared memory architectures.

BACKGROUND

In SMAs (shared memory architecture), data and program partitioning is typically carried out by placing data requiring processing by multiple threads into the shared memory and splitting the program to be more independently executed by the processors, thus making programming easier compared to message passing (MPA) architectures in which processing happens always locally and the programmer is responsible for moving data around accordingly. Unfortunately, most SMAs use a distributed shared memory architecture consisting of multiple interconnected processor-cache pairs, which makes cache coherency (and therefore latency tolerance) and synchronicity maintenance very expensive. This may even ruin their performance in communication intensive problems.

To tackle e.g. the above problem, the emulated shared memory (ESM), or shared memory emulation, architectures have been introduced. They incorporate a set of multithreaded processors that are connected via a high-throughput intercommunication network to a common uniformly and synchronously accessible shared memory. The memory system latency is hidden by overlapping on-going memory references and a special low-cost synchronization mechanism is established guaranteeing synchronicity at machine instruction level. The ESM systems provide the user with perception of ideal shared memory even though the actual hardware architecture comprises a physically distributed memory. From a theoretical standpoint, these architectures attempt to emulate the abstract parallel random access machine (PRAM) that is commonly used as a model for describing and analyzing the intrinsic parallelism of computational problems as well as performance and cost of executing parallel algorithms due to its simplicity and expressivity. A PRAM model generally refers to a set of processors working under the same clock and a uniform single step accessible shared memory connected to them.

Accordingly, ESM is a feasible technique to address programmability and performance scalability concerns of chip multiprocessors (CMP) as it yields implied synchrony in the execution of machine instructions, efficient latency hiding technique, and sufficient bandwidth to route all the memory references even with heavy random and concurrent access workloads. Synchronous execution is considered to make programming easier as a programmer does not need to synchronize the threads of execution explicitly after each global memory access but can rely on the hardware to take care of that automatically, whereas e.g. in message passing architectures (MPA), a programmer is responsible for explicitly defining communication, synchronizing subtasks, and describing data and program partitioning between threads making MPAs difficult to program. Latency hiding used in shared memory emulation makes use of the high-throughput computing scheme, where other threads are executed while a thread refers to the global shared memory. Since the throughput computing scheme employs parallel slackness extracted from the available thread-level parallelism, it is considered to provide enhanced scalability in contrast to traditional symmetric multiprocessors and non-uniform memory access (NUMA) systems relying on snooping or directory-based cache coherence mechanisms and therefore suffering from limited bandwidth or directory access delays and heavy coherence traffic maintenance.

Recently, scalable ESM architectures have been suggested incorporating step caches to implement the concurrent read concurrent write (CRCW) memory access variant of PRAM, which further simplifies programming and increases performance by a logarithmic factor in certain cases. Also a mechanism to support constant execution time multi(-prefix) operations—implementing even stronger multioperation concurrent read concurrent write (MCRCW) variant of the PRAM model—has been implemented with the help of scratchpads that are attached to step caches in order to bound the associativity of step caches. For instance, publications 1: M. Forsell, Step Caches—a Novel Approach to Concurrent Memory Access on Shared Memory MP-SOCs, In the Proceedings of the 23th IEEE. NORCHIP Conference, Nov. 21-22, 2005, Oulu, Finland, 74-77, 2: M. Forsell, Reducing the associativity and size of step caches in CRCW operation, In the Proceeding of 8th Workshop on Advances in Parallel and Distributed Computational Models (in conjunction with the $20^{th}$ IEEE International Parallel and Distributed Processing Symposium, IPDPS'06), Apr. 25, 2006, Rhodes, Greece, 3: M. Forsell, Realizing Multioperations for Step Cached MP-SOCs, in the Proceedings of the International Symposium on System-on-Chip 2006 (SOC'06), Nov. 14-16, 2006, Tampere, Finland, 77-82., 4: M. Forsell, TOTAL ECLIPSE—An Efficient Architectural Realization of the Parallel Random Access Machine, In Parallel and Distributed Computing Edited by Alberto Ros, IN-TECH, Vienna, 2010, 39-64., and 5: M. Forsell and 3. Roivainen, Supporting Ordered Multiprefix Operations in Emulated Shared Memory CMPs, In the Proceedings of the 2011 International Conference on Parallel and Distributed Processing Techniques and Applications (PDPTA'11), Jul. 18-21, 2011, Las Vegas, USA, 506-512, contemplate different aspects of such a solution and are thereby incorporated herein by reference in their entireties. Multi(-prefix) operations can be defined for many basic operations, e.g. ADD, SUB, MAX etc., and considered as parallel primitives due to the capability to express parallel algorithms. They can be used for synchronization and parallel data structures simultaneously accessed by several processors without race conditions and other anomalies of architectures executing threads asynchronously.

In FIG. 1, a high-level illustration of a scalable architecture to emulate shared memory on a silicon platform is shown. It comprises a set of processors (cores) P1, P2, P3, . . . , Pp 102 connected to a physically distributed, but logically shared (data) memory M1, M2, M3, . . . , Mp 112 via a physically scalable high bandwidth interconnection network 108. Active memory units 110 in connection with data memory 112 can be considered as memory control logic units utilized to process the memory references. The active memory units 110 are arranged to manage computation related to cases in which multiple memory references are targeted to the same memory location during e.g. multi(-prefix) operations, for instance. Instruction memory modules I1, I2, I3, . . . , Ip 104 are configured to carry the program code for each processor 102. To efficiently emulate shared memory by the distributed memory-based implementation, the processors 102 are multithreaded utilizing a Tp-stage cyclic, interleaved inter-thread pipeline (Tp≥the average latency of the network). The PRAM model is linked to the architecture such that a full cycle in the pipeline corresponds typically to a single PRAM step. During a step of multi-threaded execution (regarding the pipeline in overall, i.e. all pipeline stages including the actual execution stage), each thread of each processor of the CMP executes an instruction including at most one shared memory reference sub-instruction. Therefore a step lasts for multiple, at least Tp+1 clock cycles.

In the depicted architecture, step caches are generally associative memory buffers in which data stays valid only to the end of ongoing step of multithreaded execution. The main contribution of step caches to concurrent accesses is that they step-wisely filter out everything but the first reference for each referenced memory location. This reduces the number of requests per location from P Tp down to P allowing them to be processed sequentially on a single ported memory module assuming Tp≥P. Scratchpads are addressable memory buffers that are used to store memory access data to keep the associativity of step caches limited in implementing multioperations with the help of step caches and minimal on-core and off-core ALUs (arithmetic logic unit) that take care of actual intra-processor and inter-processor computation for multioperations. Scratchpads may be coupled with step caches to establish so-called scratchpad step cache units S1, S2, S3, . . . , Sp 106.

One underlying idea of the reviewed solution is indeed in the allocation of each processor core 102 with a set of threads that are executed efficiently in an interleaved manner and hiding the latency of the network. As a thread makes a memory reference, the executed thread is changed and the next thread can make its memory request and so on. No memory delay will occur provided that the reply of the memory reference of the thread arrives to the processor core before the thread is put back to execution. This requires that the bandwidth of the network is high enough and hot spots can be avoided in pipelined memory access traffic. Synchronicity between consecutive instructions can be guaranteed by using an elastic synchronization wave between the steps, for instance.

FIG. 2 shows, at 200, one illustration of an ESM CMP architecture incorporating e.g. the aforementioned active memory units 112B (with ALU and fetcher) in connection with data memory modules 112 and scratchpads 206B. The network 108 may be a mesh-like interconnection network acting as a high-bandwidth pipelined memory system with switches 108B. The memory access latency is hidden by executing other threads while a thread is referencing the uniformly accessible distributed shared memory via the network 108. Congestion of references and hot spots in communication are avoided with an efficient dead-lock free intercommunication architecture featuring high bandwidth (bisection BW≥P/4) and randomized hashing of memory locations over the distributed memory modules. Execution of instructions happens in steps corresponding to a single PRAM step during which each thread executes a single instruction.

Despite of the many aforementioned advantages, ESM systems have appeared difficult to realize in truly optimal fashion. A physically feasible memory unit (MU) making use of step cache and scratchpad techniques to support strong concurrent memory access and multi(-prefix) operations is easily comprehensible as one key component of powerful emulated shared memory architecture like REPLICA (Removing Performance and programmability Limitations of Chip multiprocessor Architectures), which is basically a configurable ESM. Such MU sends the outgoing memory references to the shared memory system as well as waits and receives possible replies therefrom. Unfortunately, in the prior art MU solution described below in more detail, the low-level implementation details are non-existent and the proposed arrangement requires relatively complex multiport step caches and scratchpads or complex sorting arrays and large node-wise buffers. In addition, the receive logic of the prior solution accesses both step cache and scratchpad during a single clock cycle and the performance of the latter one is spoiled by two step minimum latency for all memory operations. All this rules the already-available MU solution rather impractical.

FIG. 3 represents, at 300, a high-level block diagram and pipeline of a typical MCRCW ESM processor making use of step caches. A processor in a step cache-based MCRCW (C)ESM CMP comprises A ALUs, M memory units (MU), a distributed or unified register block, a sequencer and some glue logic. In the figure Ax 302 refers to ALU x, IF 308 refers to instruction fetch logic, MEM 304 refers to memory unit stage, OS 306 refers to operand selection logic and SEQ 310 refers to sequencer. As implied in the figure, there are ALUs 302 logically positioned prior to and after the memory unit wait segment.

Typical integer-based arithmetic operations taken care of by ALUs in the modern processor architectures include addition, subtraction, multiplication and division. Further, the ALUs are often responsible for performing logical operations that may incorporate comparing e.g. two data elements to each other to sort out which was smaller/bigger or whether they were equal, and making related decisions based on the outcome of such comparisons.

It is, nevertheless, necessary or at least beneficial in many contexts including SMAs to be able to execute arithmetic operations also on decimal numbers. For such purpose, specialized components called floating point units (FPU) working on floating-point numbers have been generally introduced in the past. However, simply adding a number of FPUs to any particular processor architecture and related pipeline structure under scrutiny is not a trivial task if done carefully and effectively. Adoption of the FPU(s) in the existing architecture and pipeline without meticulous consideration could easily increase the latency of also other operations somewhat considerably and add to the complexity of the overall circuit layout unnecessarily much.

SUMMARY OF THE INVENTION

The objective is to at least alleviate one or more problems described hereinabove not yet fully satisfactorily addressed by the known ESM arrangements, and to provide a feasible solution for executing floating point operations effectively thereat.

The objective is achieved by embodiments of processor architecture in accordance with the present invention.

Accordingly, in one aspect of the present invention a processor architecture arrangement for emulated shared memory (ESM) architectures, comprises a number of, preferably a plurality of, multi-threaded processors each provided with interleaved inter-thread pipeline and a plurality of functional units for carrying out arithmetic and logical operations on data, wherein the pipeline comprises at least two operatively parallel pipeline branches, first pipeline branch comprising a first sub-group of said plurality of functional units, such as ALUs, arranged for carrying out integer operations, and second pipeline branch comprising a second, non-overlapping sub-group of said plurality of functional units, such as FPUs, arranged for carrying out floating point operations, and further wherein one or more of the functional units of at least said second sub-group arranged for floating point operations are located operatively in parallel with the memory access segment of the pipeline.

Preferably also one or more of the functional units of the first sub-group are located operatively in parallel with the memory access segment of the pipeline.

In one embodiment, at least two or more of the functional units of the second sub-group are chained together. Two or more chains of functional units, wherein data may be passed from one unit to another, are formed. The chained functional units may be configured to execute mutually different operations on the input data (operands).

In another embodiment, a number of functional units in a branch such as the first and/or second pipeline branch are functionally positioned before memory, some in parallel, and some optionally after the memory access segment.

In a further embodiment, at least two units of said second sub-group are mutually of different length as to the execution time, or latency, thereof determined e.g. in clock cycles. Units with longer latency may be configured for executing more complex operations and vice versa. Similar arrangement may be applied to the units of the first sub-group as well.

Yet in a further embodiment, at least part of the functional units are controlled through predetermined (sub-)instruction operation field(s) and associated values provided in the instruction, or 'instruction word'.

Still in a further embodiment, an operand for a functional unit is determined in the operand select stage of pipeline in accordance with the operand selection field(s) (values) given in the instruction (word). Operand for a functional unit may also be inherited from a previous functional unit connected thereto in the chain. Connections between functional units may be enabled by a number of multiplexers controlled by the instruction words.

In a further embodiment, the second sub-group of functional units comprises at least one unit configured to execute at last one floating-point operation, e.g. arithmetic operation and/or logical operation, preferably selected from the group consisting of: addition, subtraction, multiplication, division, comparison, transformation from integer to floating point, transformation from floating point to integer, square root, logarithm or logarithmic operation, exponentiation, and integer part of logarithm.

In some embodiments, a first functional unit of said second sub-group may be configured to execute a plurality of operations. Optionally, a second functional unit of said second sub-group may be configured to execute a certain operation only. Such certain operation may refer to a more complex and thus typically more latency introducing operation, such as division or square root, than many other operations such as addition or subtraction potentially executed by a single unit such as the aforesaid first unit. Optionally, a third functional unit of said second sub-group may be configured to execute multiple operations of the same type (e.g. roots) and/or complexity (latency).

The utility of the present invention emerges from a variety of properties depending on each particular embodiment thereof. First of all, by the introduction of parallel floating point and integer pipelines, or effectively pipeline sections, the two may function and execute operations simultaneously and also during the memory access segment, in a multi-threaded processor provided with interleaved inter-thread pipeline. Functional units may be cleverly organized into a number of chains to further increase the throughput and enable versatile operations. Yet, instruction-level parallelism related to emulated shared memory execution may be captured even though the scheduled floating point operations are fully dependent, assuming that the application in question contains enough thread-level parallelism. Available virtual instruction-level parallelism can be successfully utilized in the suggested solution, whereupon floating point operations may ultimately perform generally faster than in the known alternatives.

In some embodiments, the suggested type of pipeline architecture may be exploited in connection with an embodiment of a memory unit particularly designed for handling data memory access in the context of ESM processors and architectures. Generally, simultaneous memory references to a single memory address may be implemented by means of so-called step caches so that references by each processor are advantageously reduced to one during a single step of multi-threaded execution. Scratchpad memory, described in more detail hereinafter, may be cleverly utilized to store intermediate data of multi-(prefix) operations. Through the use of the memory unit, a remarkably simple hardware implementation for efficient data memory access may be obtained while the clock cycle length (duration) may be reduced by accessing both the modified step cache and scratchpad during different clock cycles.

The expression "a number of" refers herein to any positive integer starting from one (1), e.g. to one, two, or three.

The expression "a plurality of" refers herein to any positive integer starting from two (2), e.g. to two, three, or four.

The terms "operatively", "logically" and "functionally" are used herein interchangeably particularly in connection with expressions relating to "parallelism", "parallel elements", or "parallel functionalities" to differentiate from physical or merely physical parallelism, i.e. merely physically parallel layout of elements.

The term "multioperation" may generally refer herein to associative cumulative operations such as actual multi-prefixes or other otherwise corresponding operations but having no return values sent back to processors in contrast to multi-prefixes, i.e. just the content of the target memory location being thus altered.

Different embodiments of the present invention are disclosed in the dependent claims.

BRIEF DESCRIPTION OF THE RELATED DRAWINGS

Next the invention is described in more detail with reference to the appended drawings in which FIG. 1 is a block diagram of a feasible scalable architecture to emulate shared memory on a silicon platform.

DETAILED DESCRIPTION OF THE EMBODIMENTS

Figure 1:
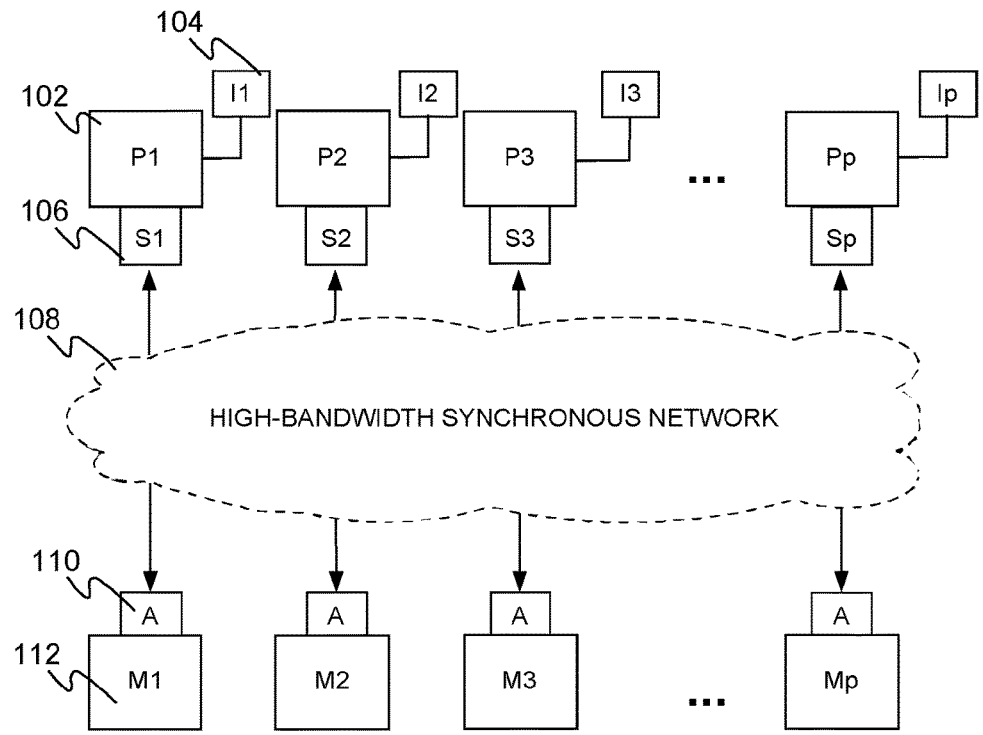
Figure 2:
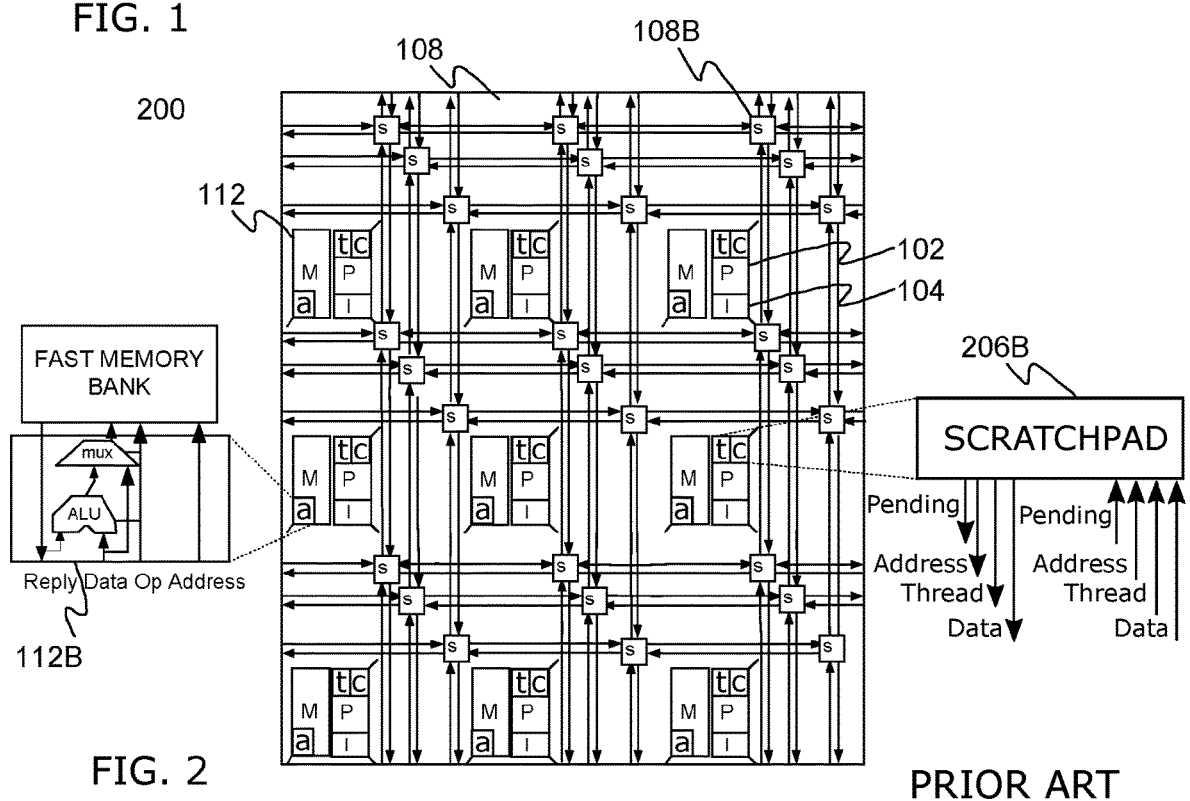
FIG. 2 is another representation of a feasible ESM architecture, essentially CMP ESM architecture.
Figure 3:
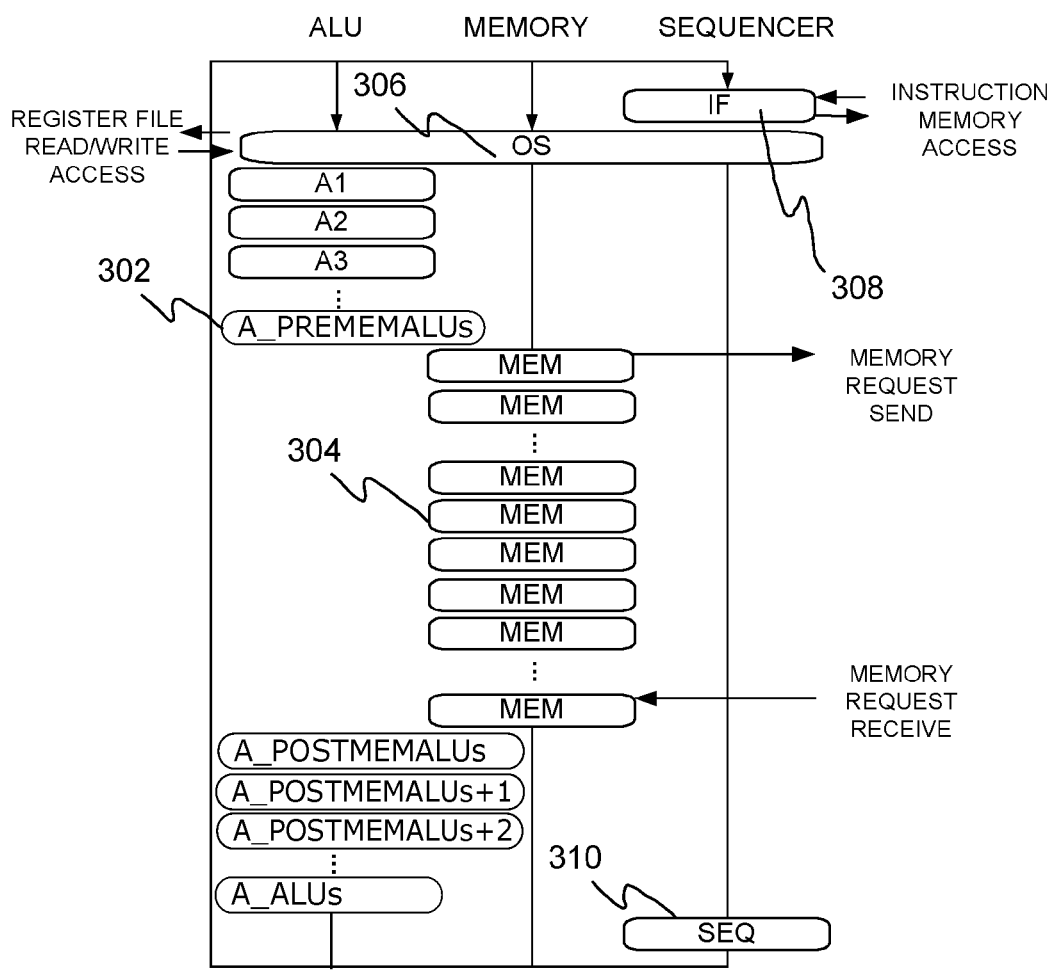
FIG. 3 is a high-level block diagram and pipeline representation of an embodiment of an MCRCW ESM processor.

FIGS. 1-3 were already contemplated hereinbefore in connection with the description of both background and historical data relating to the origin of the present invention.

Figure 4:
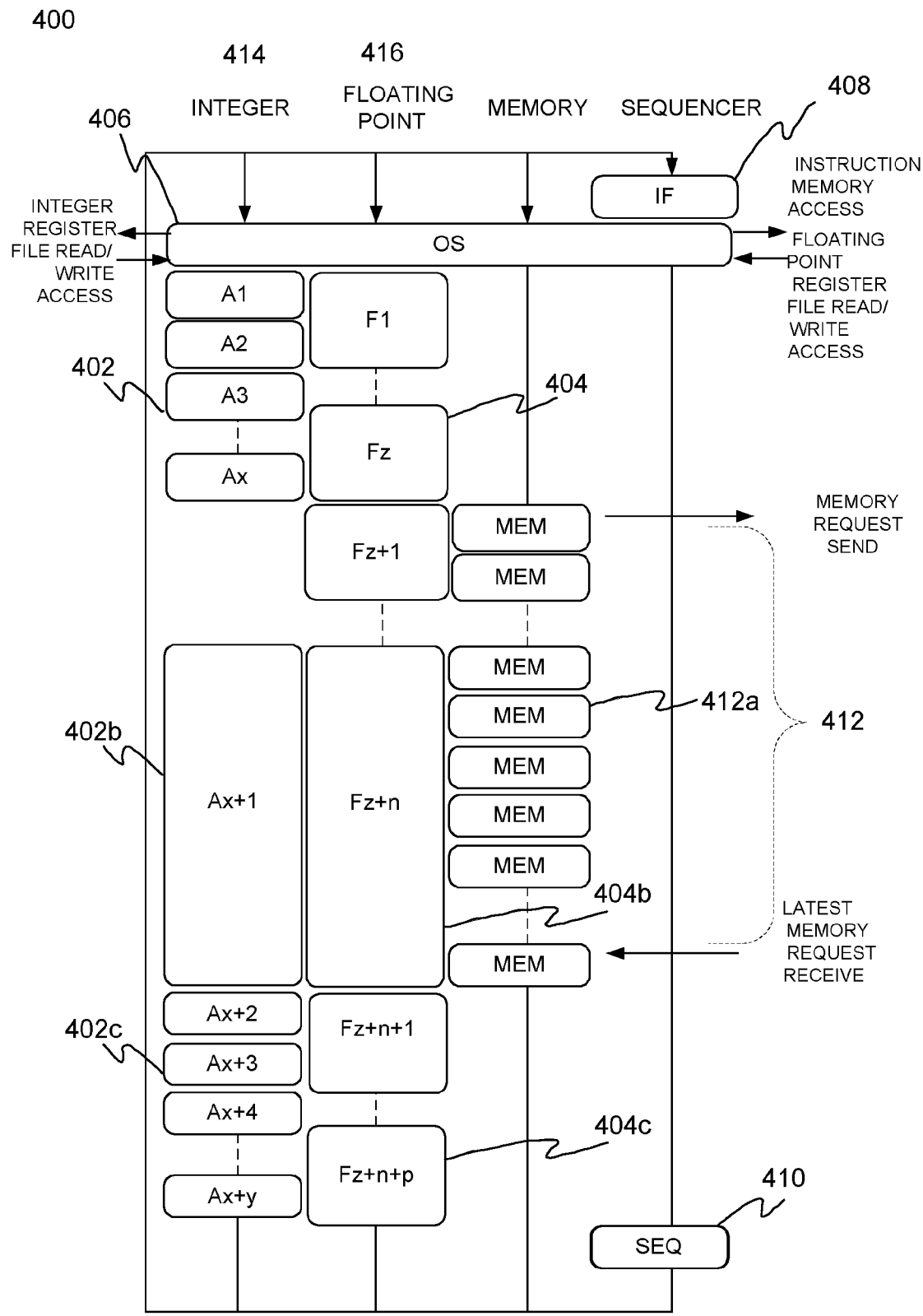
FIG. 4 illustrates an embodiment of the pipeline architecture in accordance with the present invention.

FIG. 4 illustrates an embodiment of the present invention incorporating a floating point-aware ESM pipeline architecture 400.

The pipeline comprises separate, functionally and logically parallel, branches 414, 416 for integer and floating point operations, respectively. The branches 414, 416 comprise a plurality of functional units (FU) such as multiple ALUs 402, 402b, 402c and multiple FPUs 404, 404b, 404c for carrying out operations such as predetermined arithmetic and logical operations on the data provided thereto. Latency or complexity of the functional unit is depicted by the size, or length, of the corresponding block.

The layout of the functional units 402, 402b, 402c, 404, 404b, 404c is merely exemplary in the figure and in other embodiments, the positioning, number and nature/latency of the functional units disposed in the branches 414, 416 may differ from the illustrated one. The functional units 402, 402b, 402c, 404, 404b, 404c of the integer 414 and floating point 416 branches have been provided with unique identifiers in connection with general identifiers A and F to bring forward the fact that the units 402, 402b, 402c, 404, 404b, 404c may mutually differ, also within a branch 414, 416, in terms of structure and/or functionality. However, at least some of the units 402, 402b, 402c, 404, 404b, 404c may be mutually similar in terms of structure and/or operation.

IF 408 refers to instruction fetch logic, MEM 412a refers to a single memory unit stage typically lasting for a clock cycle, OS 406 refers to operand selection logic with now both integer and floating point register file read/write access actions. The floating point register file may include a plurality of single and/or double precision FP registers and it is configured to operate in parallel with the integer pipeline. SEQ 410 refers to a sequencer.

Generally, the operands are selected by the responsible logic 406 in the beginning of the pipeline according to the corresponding operand selection field(s) in the instruction words. This involves floating point register file access and data exchange between the floating point and integer parts. The operands may be passed to the functional units via a number of register pipes.

The integer branch 414 of the pipeline may contain a number of functional units such as ALUs 402, 402b, 402c specialized in integer operations including arithmetic and/or logical operations, whereas the floating point branch 416 may contain a number of functional units such as FPUs 404, 404b, 404c specialized in floating point operations including arithmetic and/or logical operations with decimal numbers. Units in different branches 414, 416 may be configured to execute operations simultaneously.

Optionally at least some of the functional units in either, e.g. floating point 416, or both the branches 414, 416 are arranged to operate in parallel with memory access stage(s) 412a of the memory access segment 412 of the pipeline. There-upon, the concerned functional units may advantageously execute their tasks simultaneously with the memory access operation.

In the illustrated embodiment, the integer branch 414 comprises a first sub-group of functional units. Further, the first sub-group of functional units may be divided into a plurality of segments such as three segments each preferably containing a number of functional units, optionally ALUs. The segments may be located in series relative to the pipeline such that the first segment preferably contains at least one functional unit 402 logically positioned prior to the memory access segment 412, the second segment preferably contains at least one functional unit 402b logically positioned in parallel with the memory access segment 412 meaning the functional units 402b of the second segment may execute operations during pending data memory access, and the third segment preferably contains at least one functional unit 402c logically positioned after the memory access segment 412.

Further, the floating point branch 416 comprises a second sub-group of functional units. The second sub-group of functional units may be divided into a plurality of segments such as three segments each preferably containing a number of functional units, optionally FPUs. The segments may be located in series relative to the pipeline such that the first segment preferably contains at least one functional unit 404 logically positioned prior to the memory access segment 412, the second segment preferably contains at least one functional unit 404b logically positioned in parallel with the memory access segment 412, and the third segment preferably contains at least one functional unit 404c logically positioned after the memory access segment 412.

A person skilled in the art shall realize that also other embodiments with different segmentation, considering e.g. positioning, number and constitution of the segments, are feasible options depending on the use scenario. Optionally, empty segment(s) in terms of functional units, such as ALUs and/or FPUs, may be positioned in the pipeline architecture as well, e.g. in parallel with the memory access segment 412.

Optionally, a number of functional units 402b, 404b associated with more complex tasks such as division or (square) root determination may be located in parallel with the end portion of the memory access segment 412 in the corresponding pipeline branch 414, 416. Preferably the latency of such functional units 402b, 404b is still smaller than the latency of the memory access segment 412, whereupon further units may be positioned in parallel with the first memory access stages 412a of the segment 412 without increasing the overall latency of the pipeline.

Preferably, at least two or more of the functional units 402, 402b, 402c, 404, 404b, 404c of the first and/or second sub-group 414, 416 are chained together. Chaining may be generally effectuated as with the integer FUs in MTAC and MBTAC processors, for instance. Two or more chains of functional units, wherein data may be passed from one unit to another, may be thereby formed, optionally several chains per either or both branches 414, 416. Such chaining may increase the obtained performance through exploitation of available virtual instruction-level parallelism. The functional units 402, 402b, 402c, 404, 404b, 404c may be controlled by VLIW-style sub-instruction operation fields. After e.g. a floating point operation has been executed in the corresponding functional unit 404, 404b, 404c, the result is made available to the functional units situated after that unit in the respective chain via elements including e.g. multiplexers controlled by the current instruction word.

Since the floating point operations often take more time to execute than the integer operations, the number of floating point functional units may be selected smaller than the number of integer units. As some of the floating point functional units may indeed be located so as to execute their operations temporally in parallel with the memory access segment 412, it may complicate or prevent chaining floating point operations with memory operations but still yield better general performance than the standard parallel organization of functional units utilized in most prevailing architectures.

The memory unit (MU) in accordance with some embodiments of the present invention may be utilized in connection with the ESM computer architectures and preferably aforeexplained pipeline arrangement to implement e.g. CMP (chip multiprocessor) or MP-SOC (multiprocessor system on chip) system comprising a plurality of processors (cores) with dedicated instruction memories, associative step caches (retaining data inserted therein until the end of on-going step of multithreaded execution as managed by step-aware replacement policy) and non-associative (thread-addressed) scratchpad buffers attached to processors, and a physically distributed but logically shared data memory coupled via a high-bandwidth network such as a multi-mesh interconnection network to the processors (cores). The network connects processors to distributed memory modules so that sufficient throughput and tolerable latency can be achieved for random communication patterns with a high enough probability.

To maximize the throughput for read intensive portions of code, there may be separate lines for references going from processors to memories and for replies from memories to processors. Memory locations may be distributed across the data modules by a randomly or pseudo-randomly chosen polynomial. The architecture preferably implements concurrent memory access for advanced parallel algorithms, multioperations for computing prefixes and reductions optionally in constant time.

Multioperations may be implemented as a sequence of multiple, optionally two, consecutive instructions. During the execution of a multioperation such as a multi-prefix, first intra-processor multi-prefixes may be first determined, whereupon processor-wise results may be transmitted to active memory modules of the distributed shared memory elements to determine inter-processor multi-prefixes thereat (one result per processor) based on which the final multi-prefixes may be determined again within the processors themselves.

Figure 5:
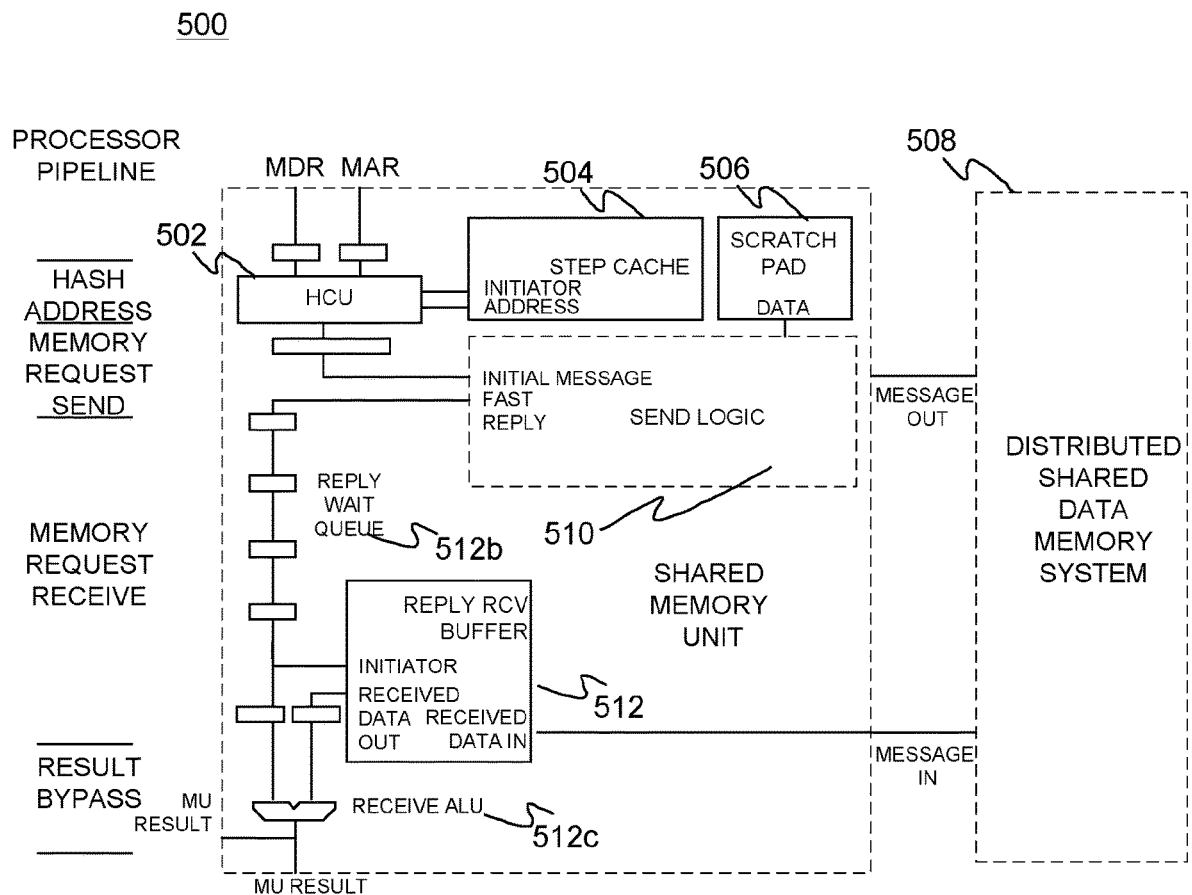
FIG. 5 illustrates an embodiment of a memory unit for ESM processor and pipeline architectures in accordance with the present invention.

With reference to FIG. 5, one embodiment of the memory unit 500 is disclosed in more detail. The memory unit 500 for handling data memory references of a multi-threaded processor provided with interleaved inter-thread pipeline in emulated shared memory (ESM) architectures, may comprise a step cache 504 defining associative cache memory array in Which data stays valid till the end of ongoing step of multithreaded execution, said memory array incorporating a plurality of cache lines with data fields, each line, preferably exclusively, containing a data field for address tag and a data field for thread id of the first thread referring to a data memory location specified by the address tag, a scratchpad 506 defining a memory buffer for storing internal data of multioperations, such as intermediate results, said buffer including, preferably exclusively, a single data field for each thread of the processor, wherein the memory unit 500 is advantageously configured to access the step cache 504 for a cache search and scratchpad 506 for retrieving or storing said internal data at different clock cycles and different stages of the processor pipeline during multioperation execution involving data memory references by the processor.

Optionally, the memory unit 500 is configured to, in response to any data memory reference by a thread of the processor, access the step cache 504 to determine whether an address matching the referenced memory address is found on the basis of address tags stored therein, and if this is the case, i.e. in the case of a cache hit, to retrieve the thread id from the thread id data field of the step cache line of the matching address. Then a write is just ignored while a read is completed by accessing the initiator data from the cache and retrieving the result from the reply receive buffer (no reason to send the reference to the shared memory as this has been already done by the initiator thread).

Conversely, in the case of cache miss, the procedure includes storing the thread id of the current thread and address tag corresponding to the referenced memory address in the step cache 504 using a predetermined data replacement policy. The thread id is thus stored to the initiator field of the cache 504. At the same time with storing the reference information to the cache line, the reference itself is sent to the shared memory system 508 and a pending bit is set. Upon receiving a reply for a read operation from the shared memory 508, the data is put to the data field of the reply receive buffer 512 and the corresponding pending bit is cleared. Predetermined cache decay logic is preferably used to invalid the lines between the steps of multithreaded execution.

Each line in the step cache 504 associated with the processor may thus contain just the initiator and address tags. Single cache array and one access port is enough since the MU 500 needs to access the step cache 504 only from a single stage.

Optionally, the memory unit 500 further comprises a reply receive buffer 512 for storing received memory reference data for the threads. The buffer is 512 configured to receive incoming (reply) messages from the shared memory system 508.

The reply receive buffer 512 may be a multiport buffer and contain e.g. two data arrays and two ports to accommodate data and e.g. 'pending' fields regarding two consecutive steps, whereupon the buffer is at least implicitly step-aware or step addressable. Further, thread id is preferably utilized for accessing the data.

In various embodiments, step data may be stored using e.g. a thread-specific data field or register. Also memory reference messages preferably include a field for step data.

Optionally, the memory unit 500 is configured to, in the case of step cache miss in connection with memory write or read operation, send a memory reference to a shared memory system 508 for storing therein or retrieving the referenced data via the reply receive buffer 512, respectively, in the case of step cache hit in connection with write operation, to ignore the write operation, and in the case of step cache hit in connection with read operation, to pick up the result from the reply receive buffer 512 with the retrieved or stored thread id.

Optionally, the memory unit 500 is configured, in connection with a multioperation, to access the scratchpad 506, i.e. store data thereto and retrieve data therefrom, with the retrieved or stored thread id in order to calculate an intra-processor multioperation result, and to send it to the shared memory system 508, wherein the memory unit may be further configured to utilize both data received in the reply receive buffer 512 from the shared memory system 508 and said intra-processor result to determine the final multioperation result (multi-prefix).

Optionally, the memory unit is provided with a hash and compose unit (HCU) 502 configured to access the step cache as described herein. The hash and compose unit 502 is preferably coupled to the step cache 504 via an access port, preferably a single access port potentially configured for exclusive use by the hash and compose unit. The hash and compose unit 502 may be configured to a construct a memory reference message based on at least one element selected from the group consisting of: the memory operation indicated by the processor (e.g. in the operation register), memory address given (e.g. in the MAR register), memory data given (e.g. in the MDR register), thread id, least significant bits (LSBs) of the step counter, and the outcome of the step cache access (i.e. nature of the outcome of the cache search, depending on whether it was a hit or miss).

The HCU 502 may indeed compute the hash addresses for memory references, compose the outgoing memory reference messages based on the memory data given in the MDR register, memory address given in the MAR register, thread identifier, memory operation from the operation register and a predetermined number of LSBs of the step counter, as well as access the step cache 504 to determine the status of the memory reference (already referenced or not by any thread during the current step of multithreaded execution).

In some embodiments, the step cache 504 may be implemented as a multi-way set associative step cache.

The addresses therein may be hashed optionally utilizing a randomly selected hashing function, for example. The HCU 502 is then utilized to compute the hash address for a memory reference.

Optionally, the memory unit 500 is provided with a memory request send logic entity 510 configured to access the scratchpad as described herein. The scratchpad may be accessed via an access port, preferably a single access port potentially configured for exclusive use by the send logic entity.

The send logic entity 510 may be configured to send the memory references to the shared memory system in accordance with the memory messages provided by the hash and compose unit 502. Based on the memory operation, the send logic 510 may be configured to determine intermediate results, or intra-processor results, of multioperations and provide the internal data such as the outcome of internal memory (multi) operation as a (fast) reply towards the reply receive buffer 512 preferably via a memory reply wait queue 512b.

In a related embodiment, the memory unit 500 further comprises a reply wait queue 512b associated with a number of pipeline stages, which queue connects the memory request send logic entity 510 and the reply receive buffer 512 so that e.g. fast replies from the send logic may be funneled in proper order towards to the reply receive buffer to timely retrieve the related memory reference result received from the shared memory and to subsequently derive the final result using a receive ALU 512c. Based on the operation, the memory reference send logic 510 may access the scratchpad 506 and send the reference on its way to the shared memory system 508 or calculate the internal memory operation result utilizing the data in the scratchpad 506 and yields the result as a (fast) reply to the memory reply wait queue 512b. The last stage of the multi-stage reply wait queue 512b may access the reply receive buffer 512 to determine if a reply with the same initiator (thread id) has already arrived. In the negative case the pipeline can be suspended until the reply arrives. Otherwise, the reply is subjected to further processing in the receive ALU 512c depending on the operation. The reply buffer 512 may contain exclusively or at least two data arrays and two ports since it stores pending bits and data from two consecutive steps of multi-threaded execution.

Multioperations are preferably implemented by using sequences of two instructions so that internal data is written to the scratchpad 506, initiator is stored to the step cache 504 and a so-called Initiator register (for linking the rest of references therewith, not shown in the figure), whereas the pending bit for multioperations is kept in the reply receive buffer 512 rather than in the scratchpad 506, the reply data is stored to the reply receive buffer 512 rather than to the step cache 504 or scratchpad 506, and the reply data for the ending operation of a multioperation is retrieved from the reply receive buffer 512 rather than from the step cache 504 or scratchpad 506 (see Table 1 for an example of multioperation implementation).

TABLE 1

Implementation of a two - step MPADD multioperation in an embodiment of the MU in accordance with the present invention PROCEDURE Processor::Execute::BMPADD ( Write_data , Write_Address )
Search Write_Address from the StepCache and put the result in matching_initiator
IF not found THEN
   StepCache[matching_initiator].address := Write_Address
   StepCache[matching_initiator].initiator_thread := Thread_id
   Initiator_thread:=Thread_id
ELSE Initiator_thread := StepCache[matching_index].Initiator_thread
On the next stage do
IF StepCache was hit during the previous stage THEN
   Read_data := ScratchPad[Initiator_thread].data
   ScratchPad[Initiator_thread].data:= Write_data + Read_data
ELSE
Read_data:=0
PROCEDURE Processor::Execute::EMPADD ( Write_data , Write_Address )
Search Write_Address from the StepCache and put the result in matching_initiator
IF not found THEN
   Initiator_thread:=Thread_id
ELSE Initiator_thread := StepCache[matching_index].Initiator_thread
On the next stage do
IF StepCache was not hit during the previous stage THEN
   Send a EMPADD reference to the memory system with
   -- address = Write_Address
   -- data = ScratchPad[Initiator_thread].Data
   ReplyReceiveBuffer[Initiator_thread,Step].Pending:=True;
PROCEDURE Module::Commit_access::EMPADD ( Data , Address )
Temporary_data := Memory [Address]
Memory[Address] := Memory[Address] + Data
Reply_data := Temporary_data
PROCEDURE Processor::Receive_reply::EMPADD ( Data , Address , Thread )
Read_Data:= ReplyReceiveBuffer [Initiator_thread].Data+FastReply.Data
ReplyReceiveBuffer[Initiator_thread].Pending := False Consequently, a skilled person may, on the basis of this disclosure and general knowledge, apply the provided teachings in order to implement the scope of the present invention as defined by the appended claims in each particular use case with necessary modifications, deletions, and additions, if any. Generally, the various principles set forth herein may be also utilized in processor architectures diverging from the one explicitly described ESM architecture, as being readily understood by the persons skilled in the art.

The invention claimed is:
1. A system comprising:
emulated shared memory (ESM) comprising a physically distributed and logically shared data memory; and
a plurality of multi-threaded processors, each multi-threaded processor of the plurality of multi-threaded processors comprising an interleaved inter-thread pipeline configured to execute a plurality of threads in a cyclic, interleaved manner such that while a thread of the plurality of threads references the physically distributed and logically shared data memory of the ESM, other threads of the plurality of threads are executed by the interleaved inter-thread pipeline,
wherein each interleaved inter-thread pipeline comprises:
a plurality of segments across the interleaved inter-thread pipeline, the plurality of segments connected in series and comprising:

a first segment beginning at a beginning of the interleaved inter-thread pipeline, a memory access segment beginning at a first latency from the beginning of the interleaved inter-thread pipeline, and a second segment beginning at a second latency from the beginning of the interleaved inter-thread pipeline, wherein the second latency is larger than the first latency; and at least three operatively parallel branches comprising:

a first parallel branch comprising a plurality of arithmetic and logic units (ALUs) that perform integer operations, wherein portions of the first parallel branch corresponding to the first segment and the second segment include at least one ALU from the plurality of ALUs, such that the first segment and the second segment each includes at least one ALU, a second parallel branch comprising a plurality of floating-point units (FPUs) that perform floating point operations, wherein portions of the second parallel branch corresponding to the first segment, the memory access segment, and the second segment all include at least one FPU from the plurality of FPUs, such that the first segment, the memory access segment, and the second segment each includes at least one FPU, and a third parallel branch comprising at least one memory unit that references the physically distributed and logically shared data memory of the ESM, wherein a portion of the third parallel branch corresponding to the memory access segment includes the at least one memory unit, such that the memory access segment includes the at least one memory unit, and wherein portions of the third parallel branch corresponding to the first and second segments include no memory units, wherein:

in the first segment, the at least one ALU of the first segment and the at least one FPU of the first segment execute simultaneously, in the memory access segment, the at least one FPU of the memory access segment and the at least one memory unit execute simultaneously, and in the second segment, the at least one ALU of the second segment and the at least one FPU of the second segment execute simultaneously, and wherein at least one of the plurality of FPUs has a longer execution latency than at least one of the plurality of ALUs.

2. The system according to claim 1, wherein a portion of the first parallel branch corresponding to the memory access segment includes at least one ALU from the plurality of ALUs, such that the memory access segment includes at least one ALU, wherein in the memory access segment, the at least one ALU, the at least one FPU, and the at least one memory unit execute simultaneously.

\* \* \* \* \*